(12) United States Patent
Grunwald et al.

(10) Patent No.: US 8,788,674 B2
(45) Date of Patent: Jul. 22, 2014

(54) BUFFERING PROXY FOR TELNET ACCESS

(75) Inventors: David Grunwald, Santa Clara, CA (US); Kartik Ayyar, Santa Clara, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 3246 days.

(21) Appl. No.: 11/034,150

(22) Filed: Jan. 12, 2005

(65) Prior Publication Data

US 2006/0155721 A1    Jul. 13, 2006

(51) Int. Cl.
*G06F 15/16* (2006.01)
*G06F 7/00* (2006.01)
*H04L 29/08* (2006.01)
*H04L 29/06* (2006.01)

(52) U.S. Cl.
CPC ..... *H04L 29/08126* (2013.01); *H04L 29/06034* (2013.01); *H04L 67/08* (2013.01); *H04L 67/2809* (2013.01)
USPC ............................ 709/227; 709/229; 707/100

(58) Field of Classification Search
USPC ................................... 709/227, 229; 707/100
See application file for complete search history.

(56) References Cited

U.S. PATENT DOCUMENTS

| | | | |
|---|---|---|---|
| 6,212,558 B1 * | 4/2001 | Antur et al. | 709/221 |
| 6,332,195 B1 * | 12/2001 | Green et al. | 726/14 |
| 6,401,123 B1 * | 6/2002 | Shields et al. | 709/227 |
| 6,463,447 B2 * | 10/2002 | Marks et al. | 715/234 |
| 6,832,256 B1 * | 12/2004 | Toga | 709/229 |
| 7,194,508 B2 * | 3/2007 | Herceg et al. | 709/203 |
| 2003/0204601 A1 * | 10/2003 | Takano | 709/227 |
| 2004/0039823 A1 * | 2/2004 | Le Pennec et al. | 709/227 |
| 2004/0054748 A1 | 3/2004 | Ackaouy et al. | 709/214 |
| 2004/0054777 A1 | 3/2004 | Ackaouy et al. | 709/225 |
| 2006/0075114 A1 * | 4/2006 | Panasyuk et al. | 709/227 |
| 2006/0075115 A1 * | 4/2006 | Chitilian et al. | 709/227 |
| 2006/0075116 A1 * | 4/2006 | Chitilian et al. | 709/227 |
| 2006/0146416 A1 * | 7/2006 | Lee | 359/676 |
| 2008/0071913 A1 * | 3/2008 | Krissell et al. | 709/227 |

OTHER PUBLICATIONS

U.S. Appl. No. 10/245,798, Emmanuel Ackaouy et al., filed Sep. 16, 2002.
U.S. Appl. No. 10/423,477, Emmanuel Ackaouy et al., Mar. 25, 2003.

(Continued)

*Primary Examiner* — Ninos Donabed
*Assistant Examiner* — Thomas Richardson
(74) *Attorney, Agent, or Firm* — Ascenda Law Group, PC

(57) ABSTRACT

A single- or multi-protocol buffering proxy accepts communication option negotiation commands from a client before establishing a connection between the client and a host. The proxy negotiates a limited set of options with the client before the connection is established and buffers (accepts and temporarily stores without responding to) other option negotiation commands from the client. The proxy accepts credentials from a user and establishes, or denies the connection based on the credentials. If the connection is established, the proxy buffers option negotiation commands sent by the host. After the proxy logs in to the host on behalf of the user or the user logs in directly, the proxy sends each party's buffered option negotiation commands to the other party, ceases buffering option negotiation commands and enters a "pass-through" mode, in which the proxy passes characters and commands between the parties until the session ends. The proxy uses the credentials to allow or deny subsequent connection requests, without re-prompting for credentials.

53 Claims, 10 Drawing Sheets

(56) References Cited

OTHER PUBLICATIONS

U.S. Appl. No. 10/425,828, Emmanuel Ackaouy et al., filed Sep. 16, 2002.
FireWall-1, Check Point Software Technologies Ltd., http://www.checkpoint.com/products/firewall-1 2004.
Check Point Application Intelligence, Check Point Software Technologies Ltd., 2004.
Attack Prevention and Blocked Attacks Application Layer, Check Point Software Technologies Ltd., http://www.checkpoint.com/appint/appint_application_layer.html 2004.
The Telnet Protocol, http://www2.rad.com/networks/1997/telnet/proj.htm 2004.
The Telnet Protocol, http://www.scit.wlv.ac.uk/~jphb/comms/telnet.html 2004.
Telnet Proxy/Server, http://www.sambar.com/syshelp/telnet.htm 2004.
RFC 858—Telnet Suppress Go Ahead Option, http://www.faqs.org/rfcs/rfc858.html, J. Postel, J. Reynolds, ISI, May 1983.
RFC 857—Telnet Echo Option, http://www.faqs.org/rfc857.html, J. Postel, J. Reynolds, ISI, May 1983.
RFC 1073—Telnet window size option, http://www.faqs.org/rfcs/rfc1073.html, D. Waitzman, BBN STC, Oct. 1988.
RFC 1091—Telnet terminal-type option, http://www.faqs.org/rfcs/rfc1091.html, J. VanBokkelen, FTP Software, Inc., Feb. 1989.
RFC 698—Telnet extended ASCII option, http://www.faqs.org/rfcs/rfc698.html, Jul. 1975.
RFC 856—Telnet binary Transmission, http://www.faqs.org/rfcs/rfc856.html, J. Postel, J. Reynolds, ISI, May 1983.
RFC 1572—Telnet Environment Option, http://www.faqs.org/rfcs/rfc1572.html, S. Alexander, Editor, Lachman Technology, Inc., Jan. 1994.
RFC 779—Telnet send-location option, http://www.faqs.org/rfcs/rfc779.html, E. Killian, LLL, Apr. 1981.
Telnet X Display Location Option, http://asg.web.emu.edu/rfc/rfc1096.html, G. Marcy, Carnegie Mellon University, Mar. 1989.
The NTLM Authentication Protocol, http://davenport.sourceforge.net/ntlm.html, pp. 1-5, Eric Glass, 2003.
Network Appliance™ Internet Access and Security Solution Delivering cost reductions and security improvements for employee Internet usage. http://www.netapp.com/solutions/ias.html, 2004.
Network Appliance™ NetCache® Software Specifications, Network Appliance, Inc. 2003.
Oracle® Application Acceleration, Eliminate end-user frustration due to application delays, http://www.netapp.com/tech_library/3155.html, TR 3155, Andy Wightman, Network Appliance, Inc., 2004.
Ackaouy et al., U.S. Appl. No. 10/423,477 "Apparatus and Method for Data Consistency in a Proxy Cache,", filed Apr. 25, 2003.
Check Point Software Technologies, Ltd. "FireWall-1", http://www.checkpoint.com/products/firewall-1/ Aug. 2004.
Check Point Software Technologies, Ltd. "FireWall-1", http://www.checkpoint.com/products/protect/platforms.html 2004.
Check Point Software Technologies, Ltd. "Check Point Application Intelligence", pp. 1-10 2004.
Check Point Software Technologies, Ltd. "Attack Prevention and Blocked Attacks Application Layer", pp. 1-6 Aug. 2004.
Solsoft—Security Policy Ma . . . , Solsoft, Inc. http://www.solsoft.com/pages/contact/contact.php Aug. 2004.
Barazovich et al., The Telnet Protocol, http://www2.rad.com/networks/1997/telnet/proj.htm, pp. 1-10 Aug. 2004.
Burden, The Telnet Protocol, http://www.scit.wlv.ac.uk/'jphb/comms/telnet.html, pp. 1-7 Aug. 2004.
Telnet Proxy Overview, Sambar Server Documentation, http://www.sambar.com/syshelp/telnet.htm 1998.
Postel et al, RFC 858 (RFC858) http://www.faqs.org/rfcs/rfc858.html pp. 1-3 May 1983.
Postal et al, RFC 857 (RFC857) http://www.faqs.org/rfcs/rfc857.html pp. 1-5 May 1983.
Waitzman et al., RFC 1073 http://www.taqs.org/rtcs/rtc1073.html pp. 1-4 Oct. 1998.
VanBokkelen, RFC 1091—Telnet terminal-type option http://www.faqs.org/rfcs/rfc1091.html pp. 1-6 Feb. 1989.
Unauthored, RFC 698—Telnet extended ASCII option, http://www.faqs.org/rfcs/rfc698.html pp. 1-4 Jul. 1975.
Postal, RFC 856—Telnet Binary Transmission, http://www.faqs.org/rfcs/rfc856.html, pp. 1-4 May 1983.
Alexander, RFC 1572 RFC 1572—Telnet Environment Option, http://www.faqs.org/rfcs/rfc1572.html pp. 1-6 Jan. 1994.
Killian, RFC 779—Telnet send-location option, http://www.faqs.org/rfcs/rfc779.html, pp. 1-2, Apr. 1981.
Marcy, Telnet X Display Location Option, http://asg.web.cmu.edu/rfc/rfc1096.html pp. 1-3 Mar. 1989.
Glass, The NTLM Authentication Protocol, http://davenport.sourceforge.net/ntlm.html, pp. 1-5 only, 2003.
Network Appliance—Solutions-Applications—Internet Access and Security, http://www.netapp.com/solutions/ias.html, pp. 1-2, Aug. 2004.
Network Appliance—NetCache Software Specifications, www.netap.com, pp. 1-2 2003.
Network Appliance—Oracle Application Acceleration, www.netap.com/tech_library/3155.html, pp. 1-5, 2004.

* cited by examiner

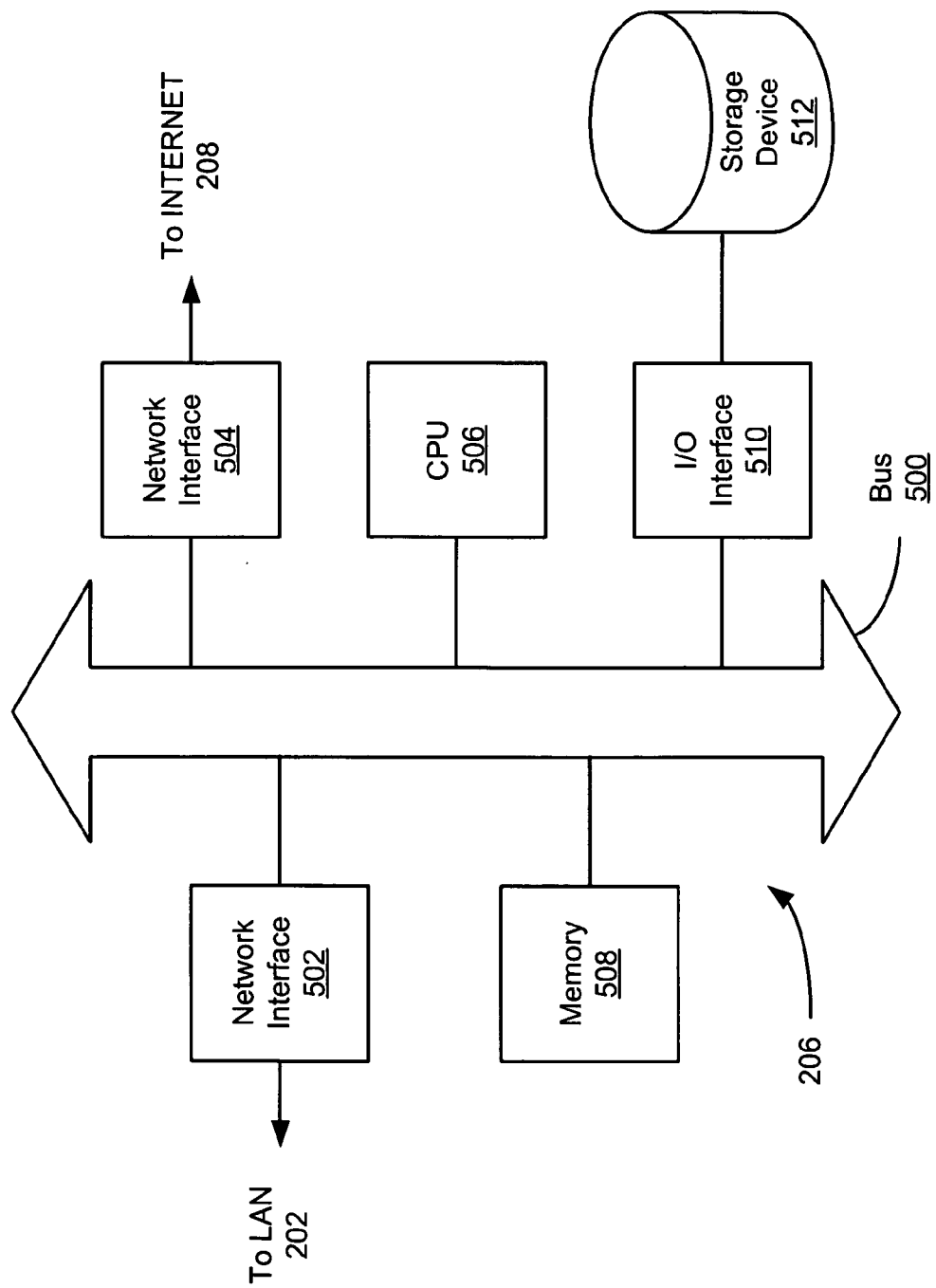

BUFFERING PROXY FOR TELNET ACCESS

CROSS REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

The present invention relates to Telnet proxies and, more particularly, to Telnet proxies that buffer option negotiation commands until after Telnet sessions are established between clients and remote servers.

Telnet is a well-known computer network protocol used to establish a connection over a network between a real or emulated terminal and a remote computer (also called a "remote server" or simply a "host"). Such a Telnet session enables a user to log in to the remote host and to engage in an interactive session with the host. A Telnet session is typically carried over a TCP/IP connection.

A Telnet session is established between a client and a server. Between the client and the server, the Telnet session simulates a Network Virtual Terminal (NVT). Data from the client, such as characters typed on a keyboard, is treated as though it was entered on the NVT, and the data is delivered to the server. Similarly, data sent by the server is treated as though it is displayed on the NVT. If a user uses Telnet to log in to a remote host, the user typically executes a terminal emulator program (the client), such as on a personal computer. The terminal emulator accepts input from a real keyboard and treats the input as though it was entered on the NVT. The terminal emulator displays characters received by the NVT on the user's real display device.

To accommodate the wide variety of hardware and software, such as keyboards and displays, that the user and the remote host can use, the Telnet protocol defines how characters sent between the client and the server are treated. These characters include 95 printable characters (such as letters, digits and punctuation marks) and 33 control characters, such as BS (backspace), CR (carriage return) and HT (horizontal tab). Most characters, such as a-z, A-Z, 0-9, punctuation marks, BS, HT (horizontal tab), FF (form feed), etc., have their normal meanings.

In addition, the Telnet protocol allows the client and the server to negotiate various options. For example, the client and the server can negotiate whether characters entered by the user are echoed locally by the terminal emulator or remotely by the server. Each party (the client and the server) can request the other party to perform or to not perform a specified option. In addition, each party can, on its own (i.e., without a request from the other party), declare to the other party that the declaring party will or will not perform a specified option.

Sometimes these option negotiations are constrained by hardware or software limitations in the client or the server. Thus, one party might refuse to perform a requested option, because it is incapable of performing the function. In other cases, one party can arbitrarily refuse to perform a requested option.

An option negotiation is conducted by sending a series of WILL, WON'T, DO and/or DON'T Telnet commands between the parties. The WILL command is used by either party to indicate that the party is willing to begin performing a specified option. For example, a first party sends a "WILL Echo" command to indicate that the party is able and willing to echo characters locally. The other party sends a "DO Echo" or "DON'T Echo" command to request that the first party begin locally echoing characters or not, respectively. The first party then responds with a "WILL Echo" or "WON'T Echo" as a positive or negative acknowledgment, respectively.

A Telnet proxy is an entity that resides in a network connection between a client and a server. The proxy presents an interface to the client in which the proxy appears to be a server. Similarly, the proxy presents an interface to the server in which the proxy appears to be a client. Some conventional Telnet proxies authenticate users, such as by requiring the users to enter valid user names and passwords, before establishing a Telnet session between the user's client and a requested remote host. When a Telnet connection is established between the client and the host, the Telnet proxy passes data sent by either party to the other party.

Some conventional Telnet proxies negotiate options with clients before establishing Telnet sessions with remote hosts, then attempt to negotiate the same options with the remote hosts. However, if the remote hosts reject the negotiation attempts, the proxies must then renegotiate the options with the clients. These renegotiations can be inconvenient and time consuming.

Some conventional Telnet proxies do not permit option negotiations to occur until after a Telnet session is established with a remote host, because the capabilities of the remote host are not known until after the Telnet session is established. However, this deferral of options negotiation delays the productive portion of the user's session with the remote host.

BRIEF SUMMARY OF THE INVENTION

The present invention provides a buffering Telnet proxy that accepts option negotiation commands from a client before a Telnet connection is established between the client and a host (Telnet server). The proxy negotiates a limited set of options with the client before the Telnet connection is established. The proxy buffers (i.e., accepts and temporarily stores without responding to) other received option negotiation commands until after the proxy establishes the Telnet connection to the host and logs in to the host on behalf of a user.

When the user identifies a host to which the user wishes to be connected, the proxy checks the user's access rights. If the user's access rights permit a Telnet connection to be established to the identified host, the proxy establishes the Telnet connection. The proxy buffers any option negotiation commands sent by the host until after the proxy logs in to the host.

The proxy attempts to log in to the host on behalf of the user. If the login succeeds, the proxy sends the client's buffered option negotiation commands to the host, and the proxy sends the host's buffered option negotiation commands to the client, all without renegotiating any options. The proxy then ceases buffering option negotiation commands sent by either party and enters a "pass-through" mode, in which the proxy passes characters and commands between the parties, until the session ends. A "party" herein refers to a user computer, a proxy, a server or the like.

These and other features, advantages, aspects and embodiments of the present invention will become more apparent to those skilled in the art from the Detailed Description Of The Invention that follows.

BRIEF DESCRIPTION OF THE SEVERAL VIEWS OF THE DRAWINGS

The invention will be more fully understood referring to the Detailed Description Of The Invention in conjunction with the Drawings, of which:

FIG. 5 is a block diagram of an exemplary hardware embodiment of the Telnet proxy of FIG. 2;

DETAILED DESCRIPTION OF THE INVENTION

In accordance with the present invention, a method and apparatus is disclosed for buffering option negotiation commands until after a Telnet connection is established between a client and a host. Before discussing the inventive buffering proxy, a brief overview of Telnet option negotiations is provided.

Telnet Option Negotiation

Figure 1:
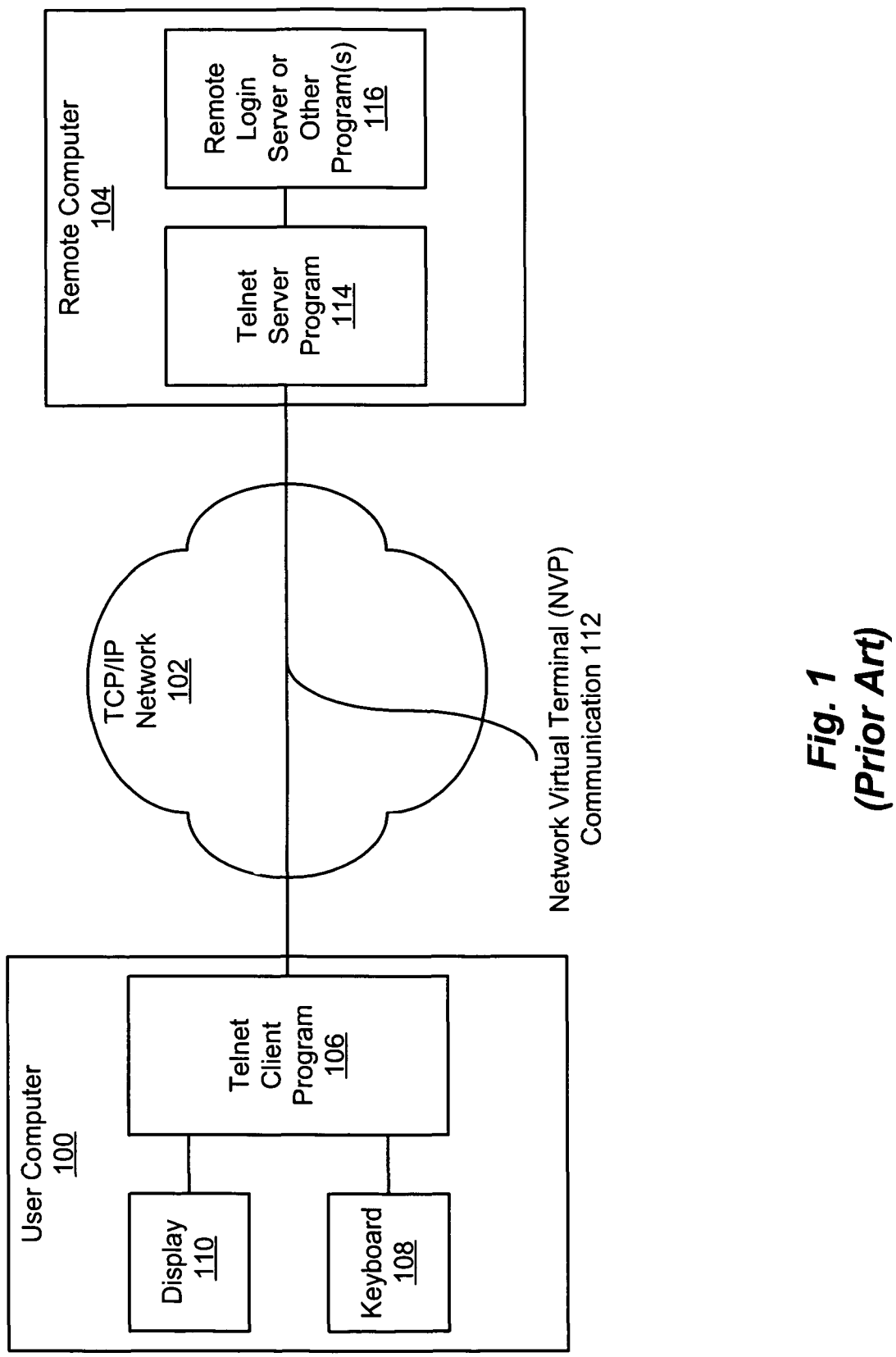
FIG. 1 is a prior art block diagram of a conventional Telnet connection between a Telnet client and a Telnet server.

FIG. 1 is a block diagram of a conventional Telnet connection between a user computer 100 and a remote computer 104 via a network 102. The user computer 100 executes a Telnet client program 106, which simulates a terminal (not shown) to a user. The Telnet client program 106 accepts inputs from the user, such as through a keyboard 108, and displays outputs to the user, such as through a display 110. The Telnet client program 106 communicates, according to the Network Virtual Terminal (NVP) 112 Telnet standard, with a Telnet server program 114 in the remote computer 104.

The Telnet server program 114 provides the user inputs to a remote login server or other program 116 being executed by the remote computer 104. Similarly, the Telnet server program 114 sends outputs from the remote login server or other program 116 to the Telnet client program 106 for display on the display 110. This arrangement enables the user to remotely log in to the remote computer 104 and interact with programs being executed there.

The Telnet protocol defines various commands that control interactions between the client 106 and the server 114. Each command is sent as a sequence of two or more bytes beginning with an "Interpret as command" (IAC) character (decimal code 255) followed by a command byte. Table 1 is a partial list of conventional Telnet command codes. Commands dealing with option negotiation are three-byte sequences, the third byte being an option code. Table 2 is an exemplary list of conventional Telnet option codes.

TABLE 1

Exemplary Telnet Commands
(Prior Art)

| Name | Code (Decimal) | Meaning |
|---|---|---|
| EC | 247 | Erase character. The receiver should delete the last preceding non-deleted character from the data stream. |
| EL | 248 | Erase line. Delete characters from the data stream back to, but not including, the previous CR LF. |
| WILL | 251 | Indicates a desire by a sender to begin performing, or confirmation that the sender is now performing, the indicate it option. |
| WON'T | 252 | Indicates a refusal by a sender to perform, or continue performing, the indicated option. |
| DO | 253 | Indicates a request that the other party perform, or confirmation that the sender is expecting the other party to perform, the indicated option. |
| DON'T | 254 | Indicates a demand that the other party stop performing, or confirmation that the sender is no longer expecting the other party to perform, the indicated option. |

TABLE 2

Exemplary Negotiable Telnet Options
(Prior Art)

| Code | Name | RFC |
|---|---|---|
| 1 | Echo | 857 |
| 3 | Suppressed go ahead | 858 |
| 24 | Terminal type | 1091 |
| 39 | Telnet environment option | 1572 |
| 31 | Window size | 1073 |
| 35 | X display location | 1096 |
| 23 | Send location | 779 |
| 0 | Binary transmission | 856 |
| 17 | Extended ASCII | 698 |

As noted above, the Telnet client program 106 and the Telnet server program 114 negotiate options by sending a series of WILL, WON'T, DO and DON'T Telnet commands to each other. Each such command begins with an IAC character, followed by a WILL, WON'T, etc. command code and ends with an option code. For example, a command to request the other party to begin locally echoing characters takes the form:

IAC (255)+DO(253)+Echo (1)

The recipient of this command can agree or decline to perform the requested option. If the recipient declines to perform the requested option, the recipient sends:

IAC (255)+WON'T (252)+Echo (1)

On the other hand, if the recipient agrees to perform the requested option, the recipient sends:

IAC (255)+WILL (251)+Echo (1)

Upon receiving the command indicating that the recipient agrees to perform the requested option, the requester sends:

IAC (255)+DO (253)+Echo (1)

Telnet option negotiations can be initiated by either party. For example, if a first party wishes to locally echo characters without having been requested to do so by the other party, the first party sends a command of the form:

IAC (255)+WILL (251)+Echo (1)

The receiving party accepts or declines this offer by sending a DO or DON'T command, respectively.

Buffering Proxy

Figure 2:
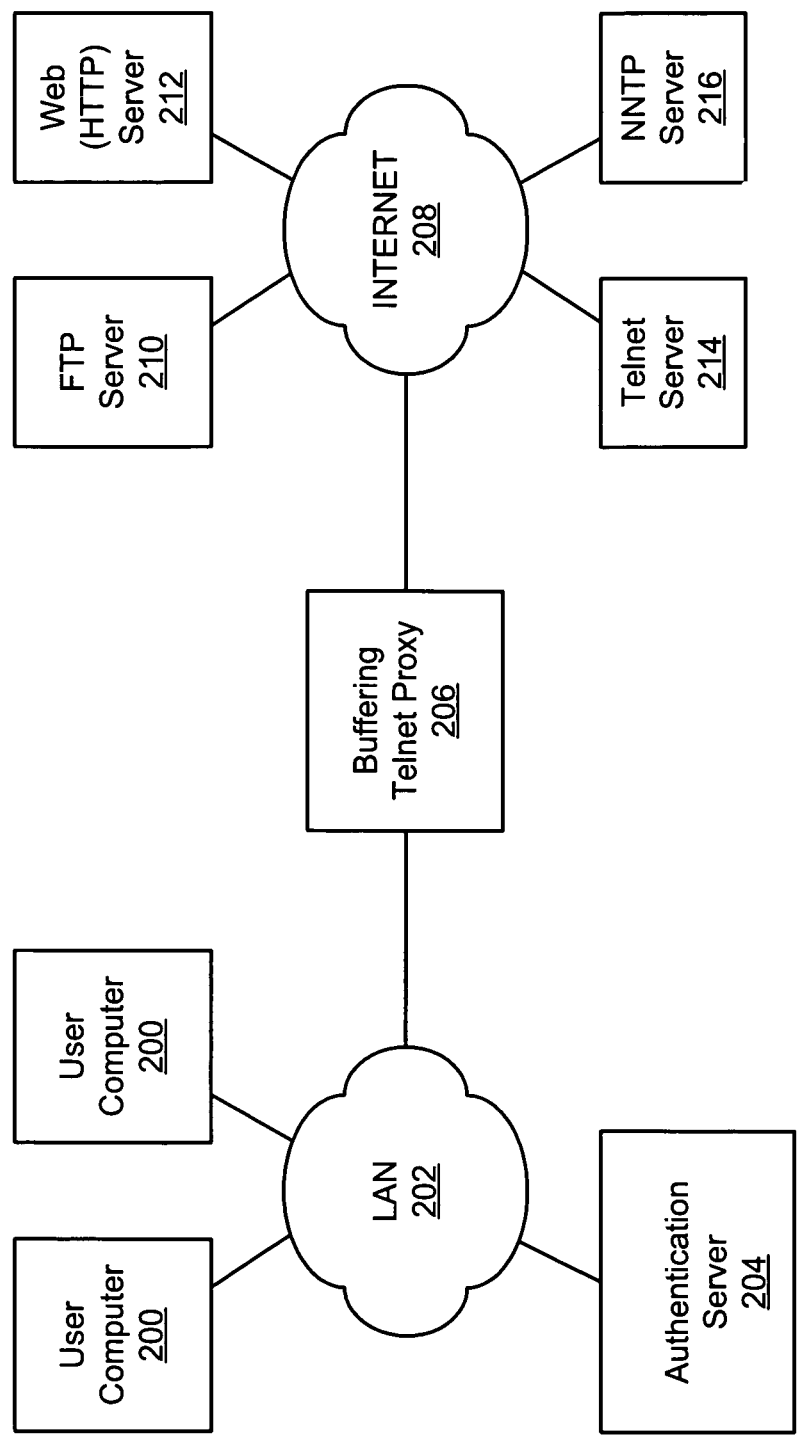
FIG. 2 is a block diagram of an exemplary network that includes a buffering Telnet proxy, in accordance with an embodiment of the present invention.

Corporations and other organizations with multiple computer users typically use local area networks (LANs) to interconnect their computers. Frequently, one or more of these computer users need to log in to, or otherwise access, a remote computer. FIG. 2 is a block diagram of an exemplary context in which a buffering Telnet proxy can be used to provide such remote access. One or more user computers 200 are connected to a LAN 202. Optionally, an authentication server 204 (described below) is also connected to the LAN 202. The LAN 202 is connected via a buffering Telnet proxy 206 to the Internet or another wide area network (WAN) 208. The buffering Telnet proxy 206 can also be used for communications among computers 200 on the LAN 202 or another suitable computer network. Various remote computers, such as an FTP server 210, a web server 212, a Telnet server 214 and an NNTP server 216, can be connected to the Internet 208. The Telnet server 214 can be included in any of the other remote computers 210, 212 or 216.

When a user of one of the computers 200 wishes to access the remote Telnet server 214, the user uses a terminal emulator program or other conventional mechanism on the user's computer 200 to communicate with the buffering Telnet proxy 206. The user identifies the Telnet server 214 to the Telnet proxy 206 and requests the Telnet proxy to establish a Telnet connection between the user's computer 200 and the Telnet server. The Telnet proxy 206 performs various functions during two separate phases. During an "authentication/setup" phase, the Telnet proxy 206 performs user authentication and, if the user is so authorized, the Telnet proxy 206 establishes the Telnet connection to the Telnet server 214, and the Telnet proxy logs in to the Telnet server 214 on behalf of the user. Following a successful login, the Telnet proxy 206 enters a "pass-through" phase. During this phase, the Telnet proxy 206 transfers data (characters and commands) between the user's computer 200 and the Telnet server 214. Each of these phases is described in more detail below.

Authentication/Setup Phase

Figure 3:
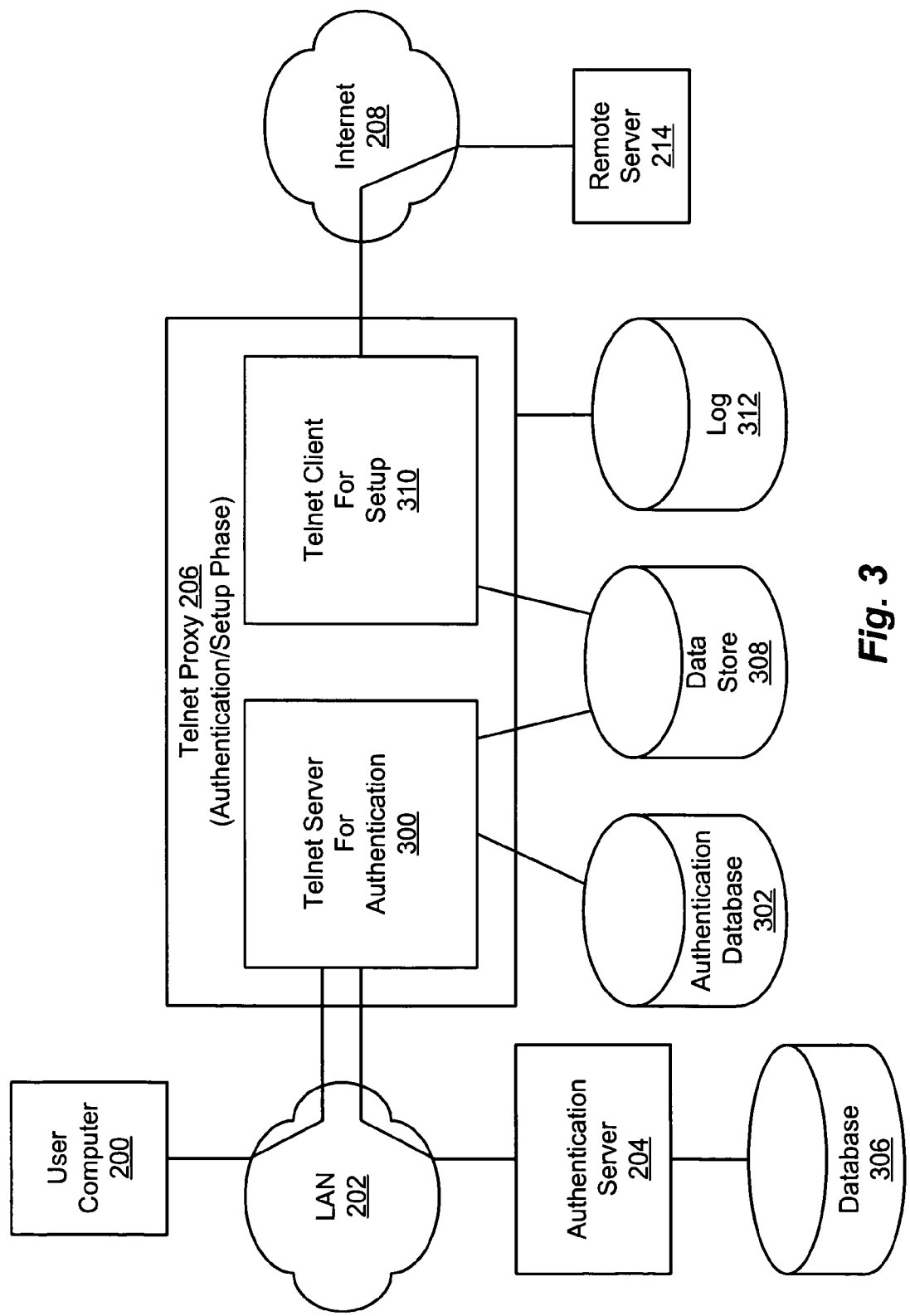
FIG. 3 is a more detailed block diagram of the network and the buffering Telnet proxy of FIG. 2 during an authentication/setup phase.
Figure 7:
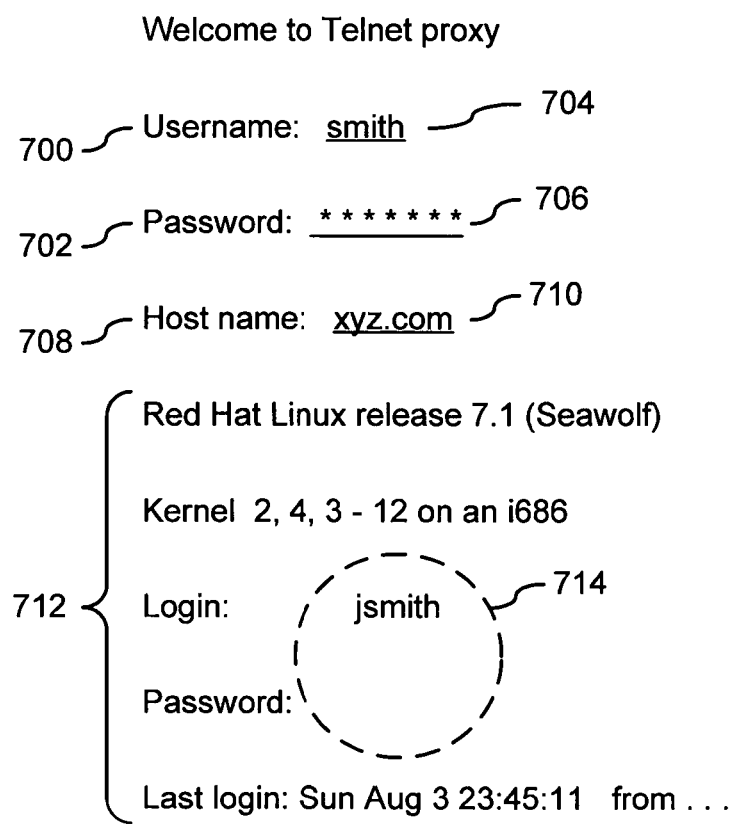
FIG. 7 depicts an exemplary interactive session between the user and the buffering Telnet proxy of FIG. 2.

FIG. 3 is a more detailed block diagram of the environment and the Telnet proxy 206 of FIG. 2 during the authentication/setup phase. Before the Telnet proxy 206 establishes a Telnet connection on behalf of the user, the Telnet proxy requires the user to provide valid credentials, typically in the form of a username/password combination. During the authentication/setup phase, a first portion of the Telnet proxy 206 (i.e. a first communication protocol proxy system for authentication, identified as a "Telnet server for authentication" 300 in FIG. 3) communicates with the user computer 200. After the user identifies the remote server 214, to which the user wishes to be connected, a second portion of the Telnet proxy 206 (i.e. a second communication protocol proxy system, identified as a "Telnet client for setup" 310 in FIG. 3) communicates with the remote server 214. An example of an interactive session between a user and the Telnet proxy 206 is shown in FIG. 7. User inputs are underlined.

The Telnet server for authentication 300 prompts the user for credentials. For example, in FIG. 7, the Telnet server for authentication 300 prompts for a username at 700 and for a password at 702. The user enters a username at 704 and a password at 706, although the password is echoed by the Telnet server for authentication 300 as asterisks.

The Telnet server for authentication 300 (FIG. 3) validates the user's responses against a local authentication database 302. Alternatively or additionally, the Telnet server for authentication 300 queries a remote authentication server 204, which maintains a database 306 of valid credentials and or/user access rights. The authentication server 204 can be a proprietary authentication server, an LDAP server, an NTLM authentication proxy server, a Kerberos Key Distribution Center (KDC) or any other mechanism that can validate user credentials or provide information regarding user access rights. Although the authentication server 204 is shown connected to the LAN 202, the authentication server can be located elsewhere, such as on the Internet 208. Optionally, the Telnet server for authentication 300 queries the authentication server 204 and locally caches all or a portion of the received information in the local authentication database 302 or in a data store 308 (described below). The local authentication database 302 and the combination of the authentication server 204 and the database 306 are collectively referred to herein as an authentication database.

The local authentication database 302 or the authentication server 204 provides information to the Telnet server for authentication 300 about the access rights of the user. These access rights indicate which remote computers the user is permitted to access and/or is forbidden to access. These access rights can be in the form of, for example, an access control list (ACL). Other user- and group-management facilities can also be employed.

After receiving the user's rights from the local authentication database 302 or from the authentication server 204, the Telnet server for authentication 300 stores this information in a data store 308, which can be a disk memory, random access memory (RAM) or any other suitable memory. Optionally, the Telnet server for authentication 300 stores an identification of the user's computer 200, such as the computer's Internet protocol (IP) address, in association with the received user rights.

The Telnet server for authentication 300 prompts the user for the name of a host, to which the user wishes to be connected, as shown at 708 (FIG. 7), and the user enters a host name, as shown at 710. The Telnet server for authentication 300 ascertains whether the user is permitted to access the requested host by comparing the entered host name to one or more lists of hosts that the user is permitted to access and/or forbidden to access. These lists are stored in the data store 308 or, alternatively, in the authentication database 302 or 306.

Optionally, the local authentication database 302 or the authentication server 204 stores user credentials, such as user names and passwords, that are valid on the remote server 214 and other computers (if any), on which the user has Telnet-accessible accounts or other accounts. These user credentials are provisioned in advance by a system administrator, for example. These user credentials can be associated with the user, the user's organization or with another entity. These credentials can be used by the Telnet client for setup 310 to log in to the remote server 214 on behalf of the user, as described in more detail below. Optionally, the Telnet server for authentication 300 also stores these user credentials in association with the information that identifies the user's computer 200 so, later, the Telnet server for authentication 300 can handle a subsequent request from the same computer 200 without necessarily querying the authentication server 204.

During the authentication/setup phase, the Telnet server for authentication 300 implements a subset of the Telnet protocol to communicate with the user's computer 200. This subset includes processing a subset of control characters, a subset of Telnet commands and a subset of options. For example, the Telnet server for authentication 300 treats each CR (carriage return) character as indicating the end of an input, such as a username, a password or a requested host's name. For another example, for each BS (backspace) character the Telnet server for authentication 300 receives, the Telnet server for authentication ignores a successively earlier-received character from the client (not shown) on the user's computer 200. The control-U character (NAK, code 21 (decimal)) causes the Telnet server for authentication 300 to ignore an entire line of received characters.

The Telnet server for authentication 300 requests the client being executed by the user's computer 200 to suppress "go ahead" and "not to echo" characters, i.e. to enter "one character at a time mode," at least while the user is entering a password. For each character of the entered password, the Telnet server for authentication 300 echoes a printable character, such as an asterisk ("*"), to provide feedback to the user without revealing the entered password. For non-password characters, the Telnet server for authentication 300 either echoes the character or requests the client to locally echo the characters. In other words, during the authentication/setup phase, the Telnet server for authentication 300 acts somewhat like an interactive shell.

If the Telnet server for authentication 300 receives an option negotiation request from the client on the user's computer 200 indicating that the client is willing to suppress "go ahead" or "to echo" characters, the Telnet server for authentication replies appropriately, i.e. the Telnet server for authentication sends the appropriate DO or DON'T acknowledgment.

If the Telnet server for authentication 300 receives an option negotiation request from the client on the user's computer 200 requesting either binary transmission (code 0, see Table 2) or extended ASCII (code 17), the Telnet server for authentication rejects the request. That is, if the user's computer 200 sends a WILL negotiation request, indicating a desire to begin performing either of these options, the Telnet server for authentication 300 replies with a DON'T negotiation request. Furthermore, if the user's computer 200 sends a DO negotiation request for either of these options, thereby requesting the Telnet server for authentication 300 to begin performing one of these options, the Telnet server for authentication replies with a WON'T negotiation request.

If the Telnet server for authentication 300 receives any other option negotiation request(s) from the client on the user's computer 200, the Telnet server for authentication buffers the received option negotiation request(s), such as in the data store 308, until after the Telnet client for setup 310 logs in to the remote server 214 on behalf of the user. The Telnet server for authentication 300 does not respond to the client on the user's computer 200 after receiving these other option negotiation request(s).

If the user's access rights permit a connection to be established to the requested remote server 214, the Telnet client for setup 310 uses information in the data store 308 to establish a Telnet connection to the remote server and to remotely log in to the remote server on behalf of the user. Alternatively, the Telnet client for setup 310 simply establishes a Telnet connection to the remote server 214 and allows the user to provide his or her credentials directly to the remote server, once the pass-through phase is entered.

If the Telnet client for setup 310 receives any option negotiation request(s) from the remote server 214 before the user is logged in to the remote server, the Telnet client for setup 310 buffers the received option negotiation request(s) in the data store 308, without responding to the remote server 214. If the Telnet client for setup 310 receives any character data from the user's computer 200, the Telnet client for setup 310 echoes this data to the user's computer according to the then-current echo option setting with the user's computer 200. The Telnet client for setup 310 buffers the received character data until after the Telnet connection is established to the remote server 214 and all buffered options are negotiated with the remote server 214. Similarly, if the Telnet client for setup 310 receives any character data from the remote server 214, the Telnet client for setup 310 buffers the received character data until after all buffered options are negotiated with the user's computer 200.

Optionally, the Telnet server for authentication 300 and the Telnet client for setup 310 log significant events in a log 312. For example, these events can include indications of successful or failed attempts by users to log in to the Telnet server for authentication 300, successful or failed attempts by the Telnet client for setup 310 to establish Telnet connections to the remote server 214, successful or failed attempts by the Telnet client for setup 310 to log in to the remote server on behalf of users and the ends of Telnet connections. Log entries can include time and date information, as well as an identification of the user (such as username), the user's computer (such as name or IP address), port number on the Telnet proxy, remote server (such as name or IP address), number of bytes or packets sent and/or received, etc. The log 312 can be used to produce reports of the number, time or frequency of user authentication attempts, successes or failures, the number of currently active Telnet connections, etc.

Welcome messages, prompts and the like from the remote server 214 are passed by the proxy 206 to the user computer 200, as shown at 712 (FIG. 7). If the Telnet client for setup 310 logs into the remote server 214 on behalf of the user, the username and password 714 are supplied by the Telnet client for setup from the data store 308. The Telnet client for setup 310 sends the username and password to the remote server 214. On the other hand, if the Telnet client for setup 310 simply establishes a Telnet connection to the remote server 214 and allows the user to enter his or her credentials directly to the remote server, the credentials 714 are entered by the user, and the Telnet proxy 206 passes these through to the remote server 214. In either case, these credentials are typically echoed by the remote server 214.

Pass-Through Phase

After the Telnet client for setup 310 establishes the Telnet connection to the remote server 214 and logs in to the remote server 214 on behalf of the user (or the user logs in directly), the Telnet proxy 206 sends the buffered negotiation requests. That is, the Telnet proxy 206 sends to the remote server 214 the buffered negotiation requests that it has received from the user computer 200, and the Telnet proxy 206 sends to the user computer 200 the buffered negotiation requests that it has received from the remote server 214. The Telnet proxy 206 passes any responses to these option negotiations through to the other party. Having buffered option negotiation requests received from one party and having subsequently forwarded these requests to the other party and having forwarded any responses received from one party to the other party, the buffering Telnet proxy 206 avoids renegotiating options.

Figure 4:
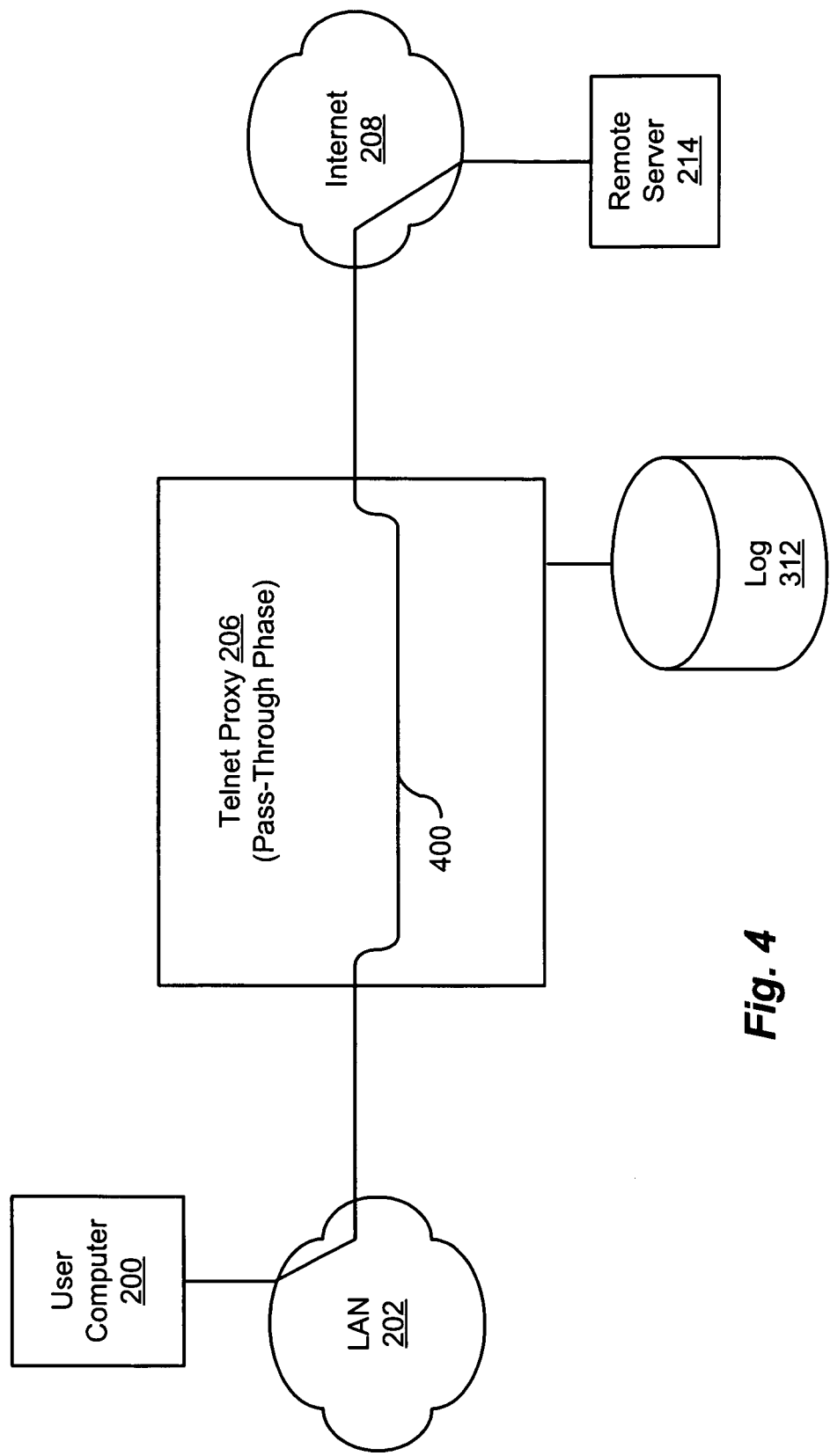
FIG. 4 is a more detailed block diagram of the network and the buffering Telnet proxy of FIG. 2 during a pass-through phase.

After the buffered negotiation requests have been sent, the Telnet proxy 206 sends any buffered character data it has received from one party to the other party and enters the pass-through phase, as shown in FIG. 4. During the past-through phase, the Telnet proxy 206 passes characters and commands it receives from one party to the other party, as indicated at 400. This pass-through is also referred to as "tunneling" through the Telnet proxy 206.

Optionally, the Telnet proxy 206 keeps track of the number of bytes transferred between the parties and occasionally or periodically writes this information to the log 312. Alternatively or in addition, the Telnet proxy 206 writes this data to the log 312 after the Telnet connection between the user computer 200 and the remote server 214 is ended.

The Telnet proxy 206 monitors the commands sent by the parties for requests to end the Telnet session. If the user computer 200 or the remote server 214 requests that the Telnet session be ended, the Telnet proxy 206 ends the Telnet session and, optionally, writes an entry in the log 312. The kind of information recorded in the log 312 is described above. The log 312 can be use to produce reports of the number, time, duration or frequency of client connections to the Telnet proxy 206 or to the remote server 214.

After the Telnet session has ended, the Telnet proxy 206 leaves the pass-through phase and returns to the authentication/setup phase. If the user subsequently requests another connection to the remote server 214, or a connection to another computer, the Telnet server for authentication 300 repeats the processing described above, i.e. the Telnet server for authentication checks whether the user is permitted to access the requested server, buffers option negotiation requests, establishes a Telnet connection to the requested server, etc. The Telnet server for authentication 300 need not, however, prompt the user for a user name and password, because the user had been previously authenticated, and the user's access rights are stored in the data store 308.

Interposing the Buffering Telnet Proxy

The buffering Telnet proxy 206 described above can be interposed between an existing Telnet client and an existing Telnet server, such as to add a user authentication service between the existing client and the existing Telnet server. If an existing client is configured to communicate with an existing server using the Telnet protocol, the buffering Telnet proxy 206 can be interposed between the existing client and the existing server transparently, i.e. without modifying the protocol between the existing client and the existing server. Because the buffering Telnet proxy 206 presents a Telnet server-like interface to the client and accepts or buffers option negotiation requests, the existing client interacts with the buffering Telnet proxy 206 in the same way it would interact with the existing Telnet server. Similarly, because the buffering Telnet proxy 206 presents a Telnet client-like interface to the server, the existing server interacts with the buffering Telnet proxy 206 in the same way it would interact with the existing Telnet client. Because the buffering Telnet proxy 206 negotiates some options with the client and with the existing Telnet server and buffers other options until after the proxy 206 establishes a Telnet connection between the parties, the interposition of the buffering Telnet proxy 206 does not disturb the Telnet communications between the parties.

The interposed buffering Telnet proxy 206 can provide a user authentication service, a usage logging service, etc., as described above. For example, before establishing a Telnet connection between the existing client and the existing Telnet server, the buffering Telnet proxy 206 can require a user to enter valid credentials. Thus, an organization that previously provided unsupervised Telnet access between clients and Telnet servers (such as Telnet servers on the Internet) can regulate this access by interposing the buffering Telnet proxy 206 between the clients and the Telnet servers. Such regulation can, for example, limit access by employees to work-related Telnet servers and block access to inappropriate Telnet servers on the Internet during work hours.

Figure 8:
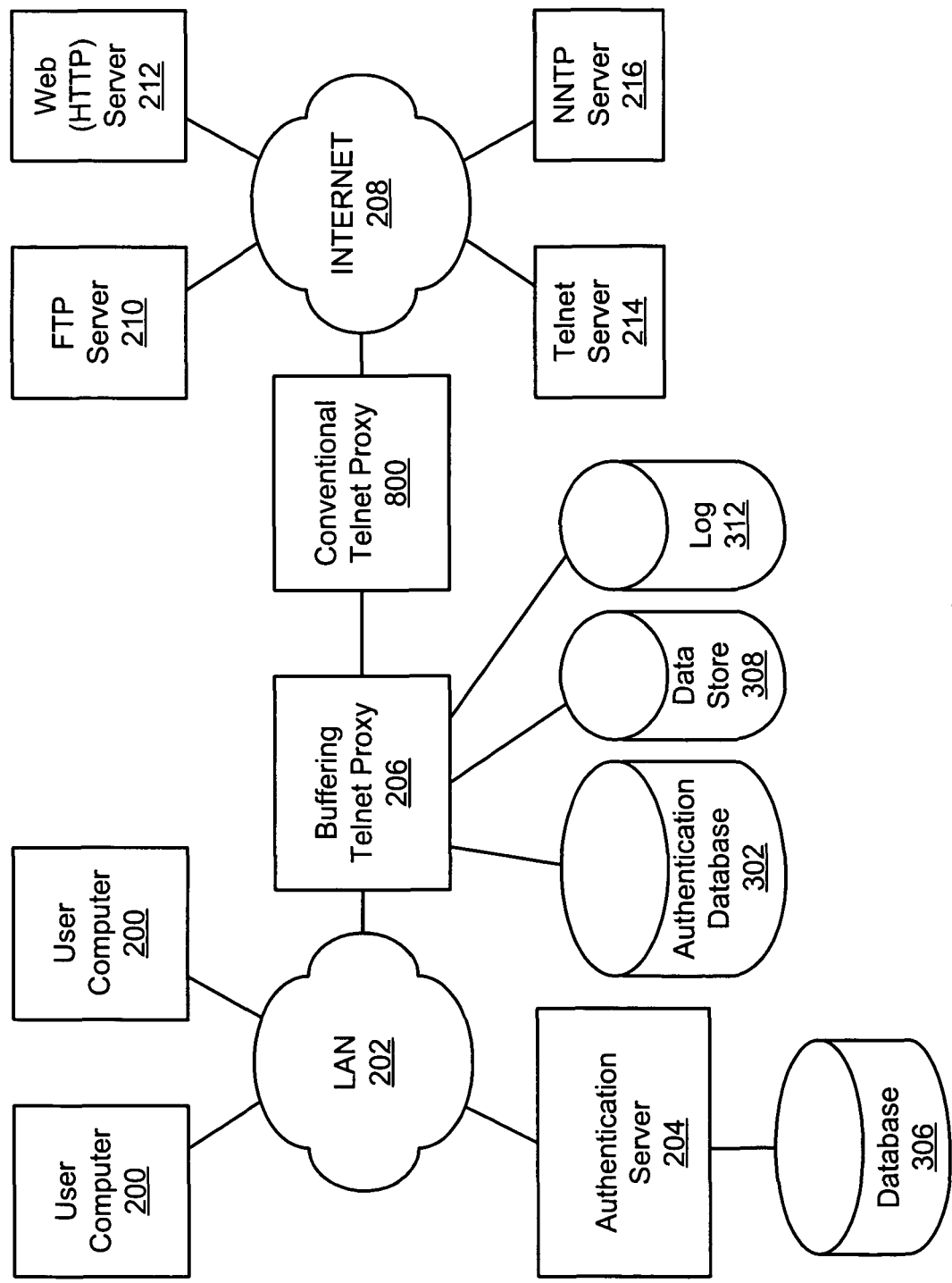
FIG. 8 is a block diagram of an another exemplary network that includes a buffering Telnet proxy, in accordance with an embodiment of the present invention.

As shown in FIG. 8, the buffering Telnet proxy 206 can also be interposed between an existing Telnet client on user's computer 200 and an existing conventional Telnet proxy 800, such as to add a user authentication service. Alternatively (not shown), the buffering Telnet proxy 206 can be interposed between the existing conventional Telnet proxy 800 and the existing Telnet server 214. Because the buffering Telnet proxy 206 presents a Telnet server-like interface to a client and a client-like interface to a Telnet server, the buffering Telnet proxy 206 can be interposed anywhere along a Telnet connection.

Hardware Embodiment

FIG. 5 is a block diagram of an exemplary hardware embodiment of the Telnet proxy 206. A bus 500 interconnects two network interfaces 502 and 504. One of the network interfaces 502 is connected to the LAN 202. The other network interface 504 is connected to the Internet 208. As noted above, the buffering Telnet proxy 206 can also be used for communications among user computers (not shown) on a LAN 202. In such cases, the second network interface 504 can be omitted. Optionally, the second network interface 504 is also connected to the LAN 202.

In some embodiments, the network interfaces 502 and 504 facilitate the conversion (translation) of messages (packets, etc.) received over the LAN 202 or over the Internet 208 according to a variety of protocols into messages according to a common message format for processing by an operating system or other control software. An exemplary operating system is Data ONTAP®, available from Network Appliance, Inc. of Sunnyvale, Calif. However, any suitable operating system that is capable of receiving and translating data from multiple protocols is acceptable.

A central processing unit (CPU) 506 and a memory 508 are also connected to the bus 500. The memory 508 can be random access memory (RAM), read-only memory (ROM), flash memory or any other memory suitable for storing the operating system, control software or other instructions and data. If the authentication database 302 (FIG. 3) is connected to the Telnet proxy 206, then an I/O interface 510 and a storage device 512 are also connected to the bus 500.

The network interfaces 502 and 504 and the I/O interface 510 and the storage device 512 (if present) are controlled by the CPU 506 executing the operating system, control software or other instructions stored in the memory 508 to perform the functions described herein. The Telnet proxy 206 of FIG. 5 optionally includes other components, such as a compact disc read-only memory (CD-ROM) drive, a compact flash (CF) or secure digital (SD) slot or another mechanism for reading from a removable medium, such as for installing or updating instructions in the memory 508. Optionally, the Telnet proxy 206 includes an interface configured to receive these instructions over a wired or wireless network or link.

Optionally, the Telnet proxy 206 can be combined with, or included in, a Network Attached Storage (NAS) device, Storage Area Network (SAN) device, NAS/SAN device, storage system, server, gateway or the like. The user computers 200 (FIG. 2), servers 210-216 and other clients may be general-purpose computers configured to execute applications under the control of a variety of operating systems, including the UNIX® and Microsoft® Windows® operating systems. These computers may utilize file-based or block-based access protocols when accessing information in a storage system over a NAS-based or SAN-based network, respectively. Therefore, each computer may request the services of the storage system by issuing access protocol messages (in the form of packets) to the storage system over the network. For example, a computer running the Windows operating system may communicate with the storage system using the Common Internet File System (CIFS) protocol over TCP/IP. On the other hand, a computer running the UNIX operating system may communicate with the storage system using the Network File System (NFS) protocol over TCP/IP. It will be apparent to those skilled in the art that other computers running other types of operating systems may also communicate with the storage system, also known as a multi-protocol storage appliance, using other file access protocols. As noted, messages received by the storage system according to various protocols from various clients are translated for execution by an operating system of the storage system.

Flowchart

Figure 6A:
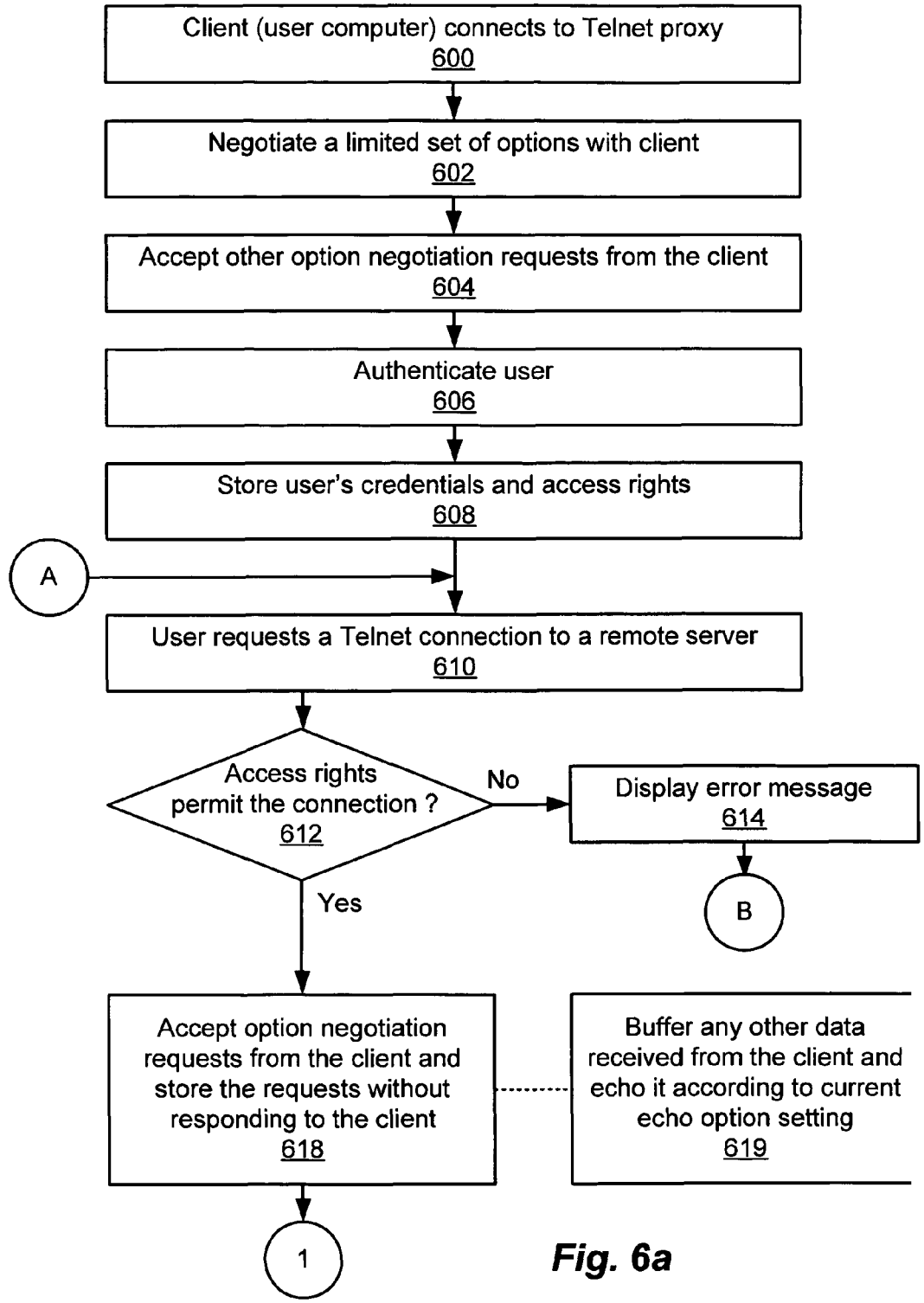
FIG. 6(a-c) is a flowchart of operations performed by the buffering Telnet proxy of FIG. 2, according to an embodiment of the present invention.
Figure 6B:
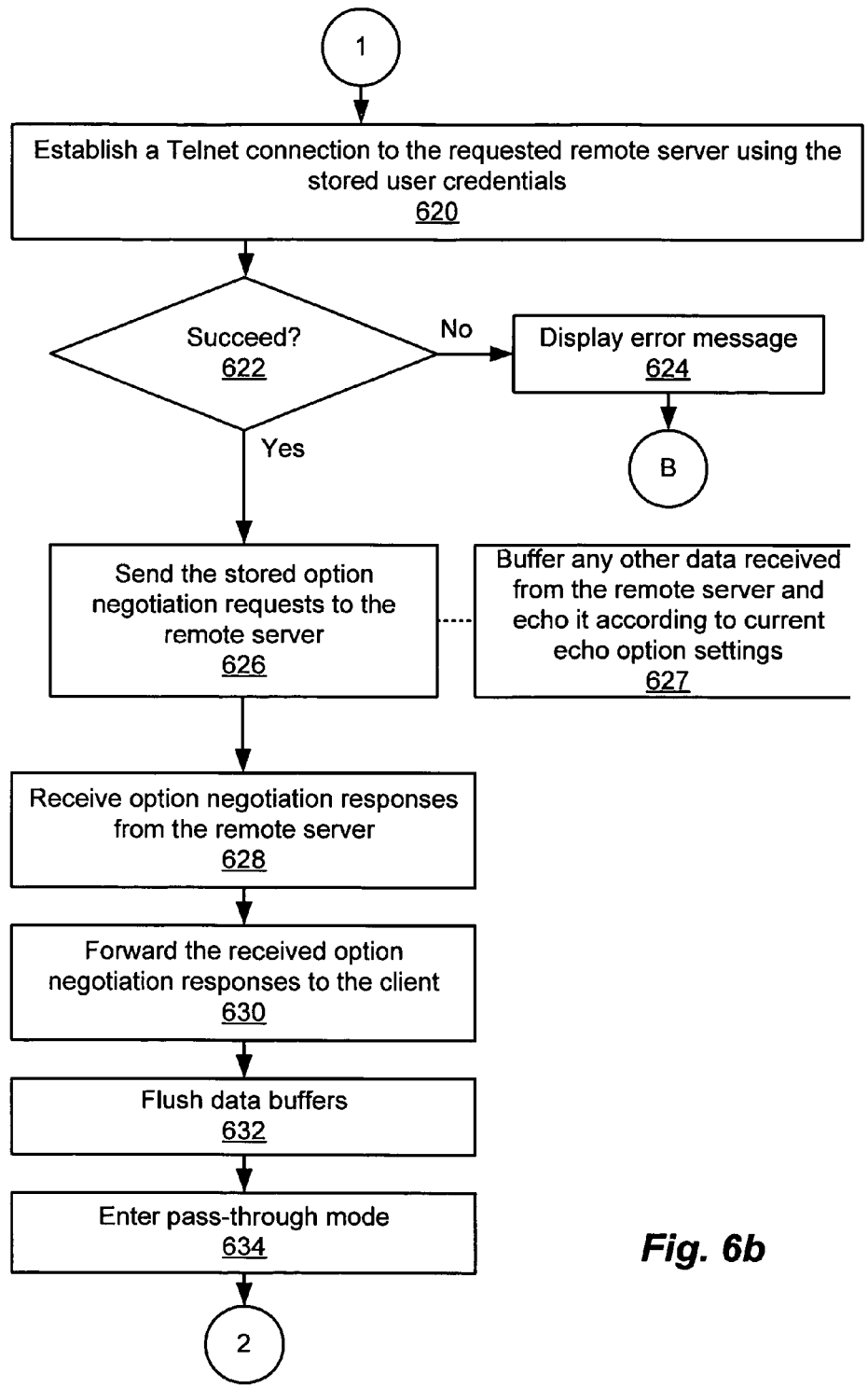
Figure 6C:
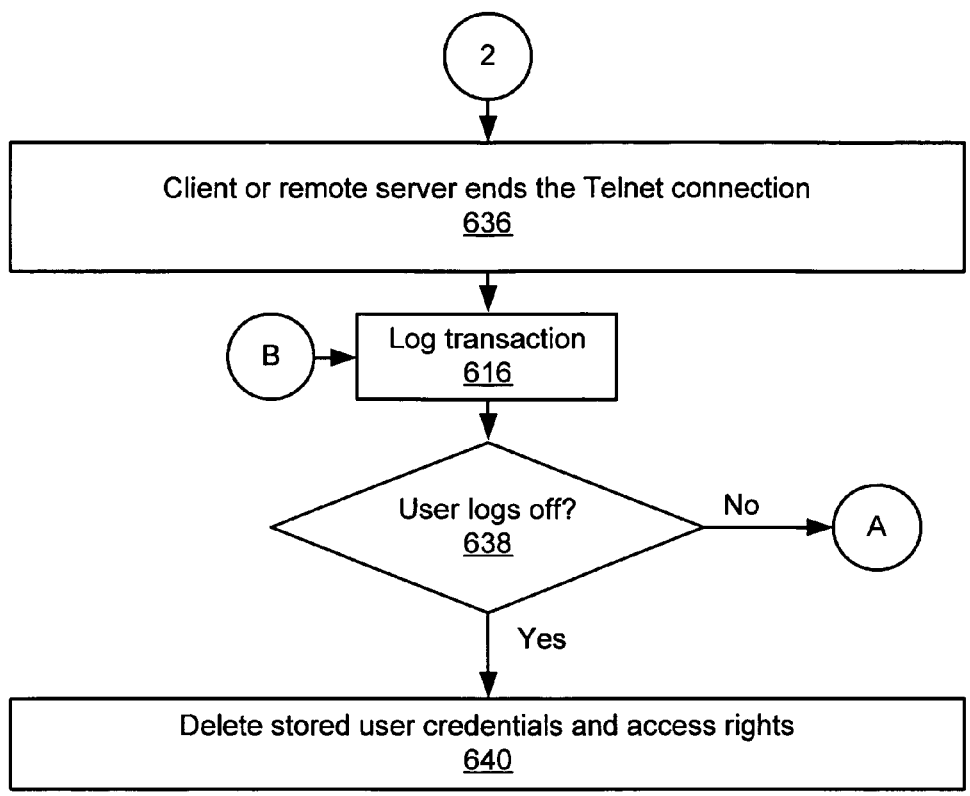

FIG. 6 (a-c) is a flowchart of operations performed by the Telnet proxy 206. At 600, a client computer connects to the Telnet proxy. At 602, the Telnet proxy negotiates a limited set of options with the client computer. This limited set of options can include "go ahead" and echo. At 604, other option negotiation requests are accepted and buffered. At 606, a user is authenticated, such as by validating user-entered credentials. At 608, the user's credentials and access rights, such as information indicating which remote servers the user may access, are stored.

At 610, the user requests a Telnet connection to a remote server. At 612, the user's access rights, relative to the requested remote server, are checked. If the user is not permitted to access the requested remote server, control passes to 614, at which an error message is displayed. After the error message is displayed, control passes to 616 (FIG. 6c), where the transaction is logged.

If, as determined at 612 (FIG. 6a), the user is permitted to access the requested remote server, control passes to 618. At 618, option negotiation requests from the client are accepted and stored, without responding to the client. As indicated in comment 619, any other character data received from the client is buffered and echoed according to the then-current echo option setting.

At 620 (FIG. 6b), a Telnet connection is established to the requested remote server using the user credentials stored at 608. If the Telnet connection is not successfully established, control passes from 622 to 624, where an error message is displayed and control is subsequently passed to 616, where the transaction is logged. If the Telnet connection is successfully established, control passes from 622 to 626, where the options stored at 618 are sent to the remote server. As indicated in comment 627, any other character data received from the remote server is buffered and echoed according to the then-current echo option setting.

At 628, responses are received from the remote server in response to the option negotiation requests that were sent to the remote server at 626. At 630, the received option negotiation responses are forwarded to the client. At 632, any character data that has been received from the client or the server and has been buffered is sent to the other party, i.e. the data buffers are flushed. At 634, pass-through mode is entered, during which character data and commands received from either party are forwarded to the other party.

At 636 (FIG. 6c), the client or the remote server ends the Telnet connection. At 616, the transaction is logged, as discussed above. At 638, if the user logs off the Telnet proxy, control passes to 640, where the stored user's credentials and access rights are deleted. On the other hand, if the user does not log off, control returns to 610 (FIG. 6a) to await a request by the user to be connected to the same or a different remote server.

Integration with other Proxied Protocols

Optionally, the buffering Telnet proxy described herein can be combined with, or included in, Network Attached Storage (NAS) devices Storage Area Network (SAN) devices, NAS/SAN devices, storage systems, servers, gateways and the like that include Internet proxy, caching, access control, content filtering, virus scanning, and/or other services. For example, the buffering Telnet proxy can be included in a device that also proxies connections established using other protocols, such as HTTP, FTP over HTTP, FTP over TCP, Gopher, SSL, NNTP, MMS, RTSP, ICAP, CIFS and/or IPv6. For example, as shown in FIG. 2, one or more of the user computers 200 can access other servers, such as FTP server 210, web (HTTP) server 212 and/or NNTP server 216 via the buffering Telnet proxy 206. In such cases, the buffering Telnet proxy 206 includes, or can be included in, a device to serve the other protocols. Such a proxy is referred to herein as an "multi-protocol proxy." The memory 508 (FIG. 5) can include instructions for the CPU 506 to handle these other protocols.

Optionally, the multi-protocol proxy uses a common set of user authentication information to allow or deny user requests for connections using various protocols and/or to various servers 210-216 (FIG. 2). Whenever the multi-protocol proxy receives a request from an unknown user computer 200 for a connection to a server 210-216 (regardless of protocol), the multi-protocol proxy prompts the user for credentials, as described above with respect to the buffering Telnet proxy. Once the multi-protocol proxy obtains information regarding the user's rights, such as from the local authentication database 302 (FIG. 3) or from the authentication server 204, the multi-protocol proxy stores this information in the data store 308 in association with an identification of the user's computer 200. As noted above, this identification can be, for example, the computer's IP address. If the multi-protocol proxy obtains credentials that can be used to log in to one or more of the remote servers 210-216 on behalf of the user, these credentials are also stored.

If the multi-protocol proxy subsequently receives a request from the same user's computer 200 to connect to the same or to a different server 210-214 (using the same or a different protocol), the multi-protocol proxy need not again prompt the user for credentials. Instead, the multi-protocol proxy uses the identity of the user's computer 200 to retrieve the associated user's access rights and/or credentials from the data store 308. Based on the retrieved user's access rights and the requested server and/or protocol, the multi-protocol proxy either establishes a connection to the requested remote server 210-214 or denies the user access to the server, as described above with respect to the buffering Telnet proxy 206. If user credentials are stored for the accessed remote server 210-214, the multi-protocol proxy uses these credentials to log in to the remote server on behalf of the user, as discussed above.

Thus, the first time a user accesses one of the remote servers 210-214, the multi-protocol proxy obtains information about the user or the user's computer 200, and the multi-protocol proxy uses this information to handle subsequent requests from the same user or computer. Consolidating user authentication in this manner streamlines the user's access to the remote servers 210-214, because the user need not provide credentials each time the user wishes to access a different server. Consolidating user authentication also simplifies system management, because user rights and stored credentials (for logging in on behalf of the user) can be centrally stored and managed. Furthermore, the multi-protocol proxy provides a consolidated log of all connections, and it can enforce connection limits, such as a maximum number of concurrent connections initiated by a single user's computer 200 or a maximum total connection time per day per user's computer.

Optionally, the information about the user's access rights and remote credentials is deleted from the data store 308 after a predetermined amount of time, in response to an explicit request from the user or in response to the user terminating the last of a set of concurrent connections through the multi-protocol proxy. This prevents one user's access rights or stored credentials from mistakenly or maliciously being used on behalf of another user.

The multi-protocol proxy also facilitates use of legacy computer systems. For example, assume a legacy computer system includes a user authentication component, such as a username/password processor. If an organization institutes a new authentication regime, the multi-protocol proxy acts as a front-end to the legacy system. The multi-protocol proxy provides user authentication (as described above) and logs in to the legacy system on behalf of users, so the users can switch to the new authentication regime, without continuing to explicitly use the legacy computer system's authentication regime.

As discussed above with respect to the buffering Telnet proxy, the multi-protocol proxy can be interposed between two parties, such as between a user computer 200 (FIG. 8) and a conventional proxy, between a user computer and a server (e.g. an FTP, HTTP, Telnet, NNTP, etc. server), between a conventional proxy and a server, etc.

A buffering Telnet proxy that accepts communication option negotiation commands from a client before establishing a Telnet connection between the client and a host has been described. In other embodiments, buffering proxies perform similar functions according to other communication protocols.

The buffering Telnet proxy has been described as logging into a remote server on behalf of a user. Although Telnet is commonly used for communication between a user and a remote server, Telnet and other communication protocols can also be used for communication between pairs of application programs, i.e. without user involvement. In these circumstances, the buffering proxy logs in to the remote server on behalf of the client application program. Thus, the term "account entity" means the user, application programs or other entity that has an account on the remote server.

A buffering Telnet proxy and a multi-protocol proxy have been described as including a processor controlled by instructions stored in a memory. Those skilled in the art should readily appreciate that instructions or programs defining the functions of the present invention can be delivered to a processor in many forms, including, but not limited to, information permanently stored on non-writable storage media (e.g. read only memory devices within a computer such as ROM or CD-ROM disks readable by a computer I/O attachment), information alterably stored on writable storage media (e.g. floppy disks and hard drives) or information conveyed to a computer through communication media. In addition, while the invention may be embodied in software, the functions necessary to implement the invention may alternatively be embodied in part or in whole using firmware and/or hardware components, such as Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. Moreover, while the preferred embodiments are described in connection with various illustrative data structures, one skilled in the art will recognize that the system may be embodied using a variety of data structures. Accordingly, the invention should not be viewed as limited, except by the scope and spirit of the appended claims.

What is claimed is:

1. A buffering communication protocol proxy for connection between a first party and a second party, comprising:
   a data store;
   a first communication protocol proxy system for authentication operative, in response to receipt of at least one communication option negotiation request from the first party before a communication connection is established between the first party and the second party, to store the received at least one communication option negotiation request in the data store; and
   a second communication protocol proxy system for setup operative to establish a communication connection to the second party and to send the stored at least one communication option negotiation request to the second party after the communication connection is established: wherein
   the first communication protocol proxy system for authentication and the second communication protocol proxy system for setup are operative to pass data through the communication protocol proxy, between the first party and the second party, after the communication connection is established.

2. The buffering communication protocol proxy of claim 1, wherein:
   the at least one communication option negotiation request is a Telnet option negotiation request; and
   the communication connection to the second party is a Telnet connection.

3. The buffering communication protocol proxy of claim 1, wherein the data is character data.

4. The buffering communication protocol proxy of claim 1, wherein the first party is a Telnet client.

5. The buffering communication protocol proxy of claim 1, wherein the first party is a Telnet proxy.

6. The buffering communication protocol proxy of claim 1, wherein the second party is a Telnet server.

7. The buffering communication protocol proxy of claim 1, wherein the second party is a Telnet proxy.

8. The buffering communication protocol proxy of claim 1, wherein the second communication protocol proxy system for setup is further operative to send the stored at least one communication option negotiation request to the second party after an account entity is logged in to the second party over the communication connection.

9. The buffering communication protocol proxy of claim 1, wherein:
the first communication protocol proxy system for authentication is further operative, in response to receipt of data from the first party before the communication connection is established, to store the received data in the data store; and
the second communication protocol proxy system for setup is further operative to send the stored data to the second party after the communication connection is established.

10. The buffering communication protocol proxy of claim 9, wherein the second communication protocol proxy system for setup is further operative to send the stored data to the second party after an account entity is logged in to the second party over the communication connection.

11. The buffering communication protocol proxy of claim 1, wherein the first communication protocol proxy system for authentication is further operative, in response to receipt of valid user credentials from the first party, to establish the communication connection.

12. The buffering communication protocol proxy of claim 11, further comprising an authentication database, wherein the first communication protocol proxy system for authentication is further operative to validate the user credentials by accessing the authentication database.

13. The buffering communication protocol proxy of claim 12, wherein the authentication database is directly connected to the buffering communication protocol proxy.

14. The buffering communication protocol proxy of claim 12, wherein the authentication database comprises an authentication server connected to the buffering communication protocol proxy via a network.

15. The buffering communication protocol proxy of claim 12, wherein the authentication database stores user credentials for an account on the second party, and the second communication protocol proxy system for setup is further operative, in response to establishment of the communication connection, to send the user credentials stored in the authentication database to the second party to thereby log in to the second party on behalf of the first party.

16. The buffering communication protocol proxy of claim 15, wherein the second communication protocol proxy system for setup is further operative, in response to the second communication protocol proxy system for setup logging in to the second party on behalf of the first party, to send the stored at least one communication option negotiation request to the second party.

17. The buffering communication protocol proxy of claim 15, wherein:
the first communication protocol proxy system for authentication is further operative, in response to the second communication protocol proxy system for setup logging in to the second party on behalf of the first party, to receive data from the first party and to store the received data in the data store; and
the second communication protocol proxy system for setup is further operative, in response to the second communication protocol proxy system for setup logging in to the second party on behalf of the first party, to send the stored data to the second party.

18. The buffering communication protocol proxy of claim 1, further comprising a log, wherein the first communication protocol proxy system for authentication and the second communication protocol proxy system for setup are operative to write information into the log when at least one predetermined event related to the first party occurs.

19. The buffering communication protocol proxy of claim 18, wherein the at least one predetermined event related to the first party is receipt of valid user credentials.

20. The buffering communication protocol proxy of claim 18, wherein the at least one predetermined event related to the first party is receipt of invalid user credentials.

21. The buffering communication protocol proxy of claim 18, wherein the at least one predetermined event related to the first party is successful establishment of the communication connection.

22. The buffering communication protocol proxy of claim 18, wherein the at least one predetermined event related to the first party is a failure to establish the communication connection.

23. The buffering communication protocol proxy of claim 1, wherein the first communication protocol proxy system for authentication is operative to receive and store the received at least one communication option negotiation request in the data store without responding to the first party.

24. A method of establishing a communication connection between a first party and a second party, comprising:
receiving at least one communication option negotiation request from the first party;
storing the received at least one communication option negotiation request;
after storing the at least one communication option negotiation request, establishing the communication connection between the first party and the second party;
after establishing the communication connection, sending the stored at least one communication option negotiation request to the second party and passing data between the first party and the second party.

25. The method of claim 24, wherein:
the at least one communication option negotiation request is a Telnet option negotiation request; and
the communication connection between the first party and the second party is a Telnet connection.

26. The method of claim 24, wherein the data is character data.

27. The method of claim 24, wherein sending the stored at least one communication option negotiation request to the second party comprises sending the stored at least one communication option negotiation request to the second party after an account entity is logged in to the second party over the communication connection.

28. The method of claim 24, further comprising:
before the communication connection is established, receiving data from the first party; storing the received data; and
after the communication connection is established, sending the stored data to the second party.

29. The method of claim 28, wherein sending the stored data to the second party comprises sending the stored data to the second party after an account entity is logged in to the second party over the communication connection.

30. The method of claim 28, further comprising:
logging in to the second party on behalf of the first party; and
wherein sending the stored data to the second party comprises sending the stored data to the second party after logging in to the second party on behalf of the first party.

31. The method of claim 24, further comprising:
receiving user credentials from the first party; and
wherein establishing the communication connection comprises establishing the communication connection only if the user credentials are valid.

32. The method of claim 31, further comprising validating the received user credentials by accessing a local authentication database.

33. The method of claim 31, further comprising validating the received user credentials by accessing an authentication server via a network.

34. The method of claim 24, further comprising logging in to the second party on behalf of the first party.

35. The method of claim 24, wherein sending the stored at least one communication option negotiation request to the second party comprises sending the stored at least one communication option negotiation request to the second party after logging in to the second party on behalf of the first party.

36. The method of claim 24, further comprising:
detecting at least one predetermined event related to the first party; and
in response to detecting the at least one predetermined event related to the first party, writing information into a log.

37. The method of claim 36, wherein detecting at least one predetermined event comprises receiving valid user credentials. .

38. The method of claim 36, wherein detecting at least one predetermined event comprises receiving invalid user credentials.

39. The method of claim 36, wherein detecting at least one predetermined event comprises successfully establishing the communication connection.

40. The method of claim 36, wherein detecting at least one predetermined event comprises failing to establish the communication connection.

41. The method of claim 24, wherein receiving the at least one communication option negotiation request and storing the received at least one communication option negotiation request comprises receiving and storing the at least one communication option negotiation request without responding to the first party.

42. An article of manufacture, comprising:
a non-transitory computer-readable medium storing computer instructions for:
receiving at least one communication option negotiation request from a first party;
storing the received at least one communication option negotiation request;
after storing the at least one communication onion negotiation request, establishing a communication connection between the first party and a second party;
after establishing the communication connection, sending the stored at least one communication option negotiation request to the second party and passing data between the first party and the second party.

43. The article of manufacture of claim 42, wherein:
the at least one communication option negotiation request is a Telnet option negotiation request; and
the communication connection to the second party is a Telnet connection.

44. The article of manufacture of claim 42, wherein the data is character data.

45. An authenticating multi-protocol proxy, comprising:
a data store; and
a proxy operative to establish a connection according to one of a plurality of protocols between a first party having an identifier and a second party, wherein the plurality of protocols includes Telnet, HTTP and FTP, the proxy being further operative to:
prompt for user credentials before establishing a first connection between the first party and the second party;
based on entered user credentials, obtain data indicative of user access rights;
store the obtained information indicative of user access rights in the data store and associate the stored information with the identity of the first party;
based on the data indicative of user access rights, either establish or not establish the first connection between the first party and the second party; and
subsequently use the stored information to determine whether to establish or not establish a second connection between the first party and another party, without prompting for user credentials.

46. The authenticating multi-protocol proxy of claim 45, wherein the first party is a client.

47. The authenticating multi-protocol proxy of claim 45, wherein the first party is a proxy.

48. The authenticating multi-protocol proxy of claim 45, wherein the second party is a server.

49. The authenticating multi-protocol proxy of claim 45, wherein the second party is a proxy.

50. The authenticating multi-protocol proxy of claim 45, wherein the identifier of the first party is an Internet protocol (IP) address.

51. The authenticating multi-protocol proxy of claim 45, wherein the data indicative of user access rights identifies at least one second party to which a connection is permitted.

52. The authenticating multi-protocol proxy of claim 45, wherein:
the data indicative of user access rights includes user credentials for an account on the second party; and
the proxy is further operative, in response to establishment of the first connection, to send the user credentials in the data indicative of user access rights to the second party to thereby log in to the second party on behalf of the first party.

53. The authenticating multi-protocol proxy of claim 45, further comprising:
a Telnet server for authentication operative, in response to receipt of at least one Telnet option negotiation request from the first party before a Telnet connection is established between the
first party and the second party, to store the received at least one Telnet option negotiation request in the data store; and
a Telnet client for setup operative to establish a Telnet connection to the second party and to send the stored at least one Telnet option negotiation request to the second party after the Telnet connection is established; wherein
the Telnet server for authentication and a Telnet client for setup are operative to pass character data through the Telnet proxy, between the first party and the second party, after the Telnet connection is established.

* * * * *